(12) United States Patent
Sung et al.

(10) Patent No.: US 9,768,553 B2
(45) Date of Patent: Sep. 19, 2017

(54) SPRING CONNECTOR FOR ELECTRONIC DEVICES

(71) Applicant: Intel Corporation, Santa Clara, CA (US)

(72) Inventors: Gavin Sung, Taipei (TW); Jeff Ku, Taipei (TW); Lance Lin, Taipei (TW); Tim Liu, New Taipei (TW); Jason Y. Jiang, Taipei (TW)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/976,170

(22) Filed: Dec. 21, 2015

(65) Prior Publication Data

US 2017/0179645 A1    Jun. 22, 2017

(51) Int. Cl.
*H01R 13/64* (2006.01)
*H01R 13/24* (2006.01)

(52) U.S. Cl.
CPC ............. *H01R 13/64* (2013.01); *H01R 13/24* (2013.01)

(58) Field of Classification Search
CPC ... H01R 12/7005; H01R 13/64; H01R 13/642
USPC .................................................. 439/374, 378
See application file for complete search history.

(56) References Cited

U.S. PATENT DOCUMENTS

| | | | | | |
|---|---|---|---|---|---|
| 4,596,436 A | * | 6/1986 | Kraemer | ................ | H01R 13/64 439/680 |
| 5,971,800 A | * | 10/1999 | Azuma | ................ | G06F 1/1616 439/108 |
| 6,038,130 A | * | 3/2000 | Boeck | ................ | H01R 9/2675 361/729 |
| 6,340,315 B1 | * | 1/2002 | Chang | .................... | H01R 13/26 439/660 |
| 6,951,488 B2 | * | 10/2005 | Hsieh | ................ | H01R 12/7011 439/500 |
| 7,095,607 B2 | * | 8/2006 | Imamura | ............... | G06F 1/1616 361/679.56 |
| 7,852,625 B2 | * | 12/2010 | Asawa | .................. | G06F 1/1616 361/679.55 |
| 7,918,671 B2 | * | 4/2011 | Chen | .................. | H01R 13/2442 439/70 |
| 7,985,107 B2 | * | 7/2011 | Li | .......................... | H01R 12/57 439/865 |
| 8,715,019 B2 | * | 5/2014 | Ho | ...................... | H01R 12/7082 439/862 |
| 9,419,377 B2 | * | 8/2016 | Zhu | .................... | H01R 13/6205 |
| 2001/0034163 A1 | * | 10/2001 | Chiang | .................. | H01R 13/26 439/660 |
| 2008/0268712 A1 | * | 10/2008 | Wan | .................... | H01R 13/2442 439/627 |
| 2009/0017369 A1 | * | 1/2009 | Shih | ....................... | H01M 2/26 429/121 |

(Continued)

*Primary Examiner* — Tulsidas C Patel
*Assistant Examiner* — Peter G Leigh
(74) *Attorney, Agent, or Firm* — Alpine Technology Law Group LLC

(57) ABSTRACT

In one example an electronic device comprises at least one electronic component, a chassis comprising a first section, a connector to connect the first section of the chassis to a second section, the connector comprising a housing defining a first shaft, a retention structure disposed in the shaft, and a plurality of electrical contacts positioned within a corresponding plurality of channels in the retention structure. Other examples may be described.

14 Claims, 12 Drawing Sheets

(56) References Cited

U.S. PATENT DOCUMENTS

2010/0273336 A1* 10/2010 Li ..................... H01R 12/57
                                                    439/83
2012/0258620 A1* 10/2012 Kajiura ............... H01R 12/77
                                                    439/329
2015/0244107 A1* 8/2015 Lostoski ............. H01R 9/2408
                                                    439/352

\* cited by examiner

SPRING CONNECTOR FOR ELECTRONIC DEVICES

BACKGROUND

The subject matter described herein relates generally to the field of electronic devices and more particularly to a spring connector which may be used in electronic devices.

Electronic devices such as tablet computers, notebook computers, electronic readers and the like comprise displays which include touch screen technology. These devices may be coupled to a base section which may include a keyboard by a connector assembly. Accordingly additional configurations for connectors for electronic devices may find utility.

BRIEF DESCRIPTION OF THE DRAWINGS

The detailed description is described with reference to the accompanying figures.

DETAILED DESCRIPTION

Described herein are exemplary systems and methods to implement a connector in electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, it may be useful to provide electronic device displays with a connector. The subject matter described herein addresses these and other issues by providing an electronic device which comprises at least one electronic component, a chassis comprising a first section a connector to connect the first section of the chassis to a second section. The connector comprises a housing defining a first shaft, a retention structure disposed in the shaft and a plurality of electrical contacts positioned within a corresponding plurality of channels in the retention structure. Further structural and operational details will be described with reference to FIGS. 1-10, below.

Figure 4:
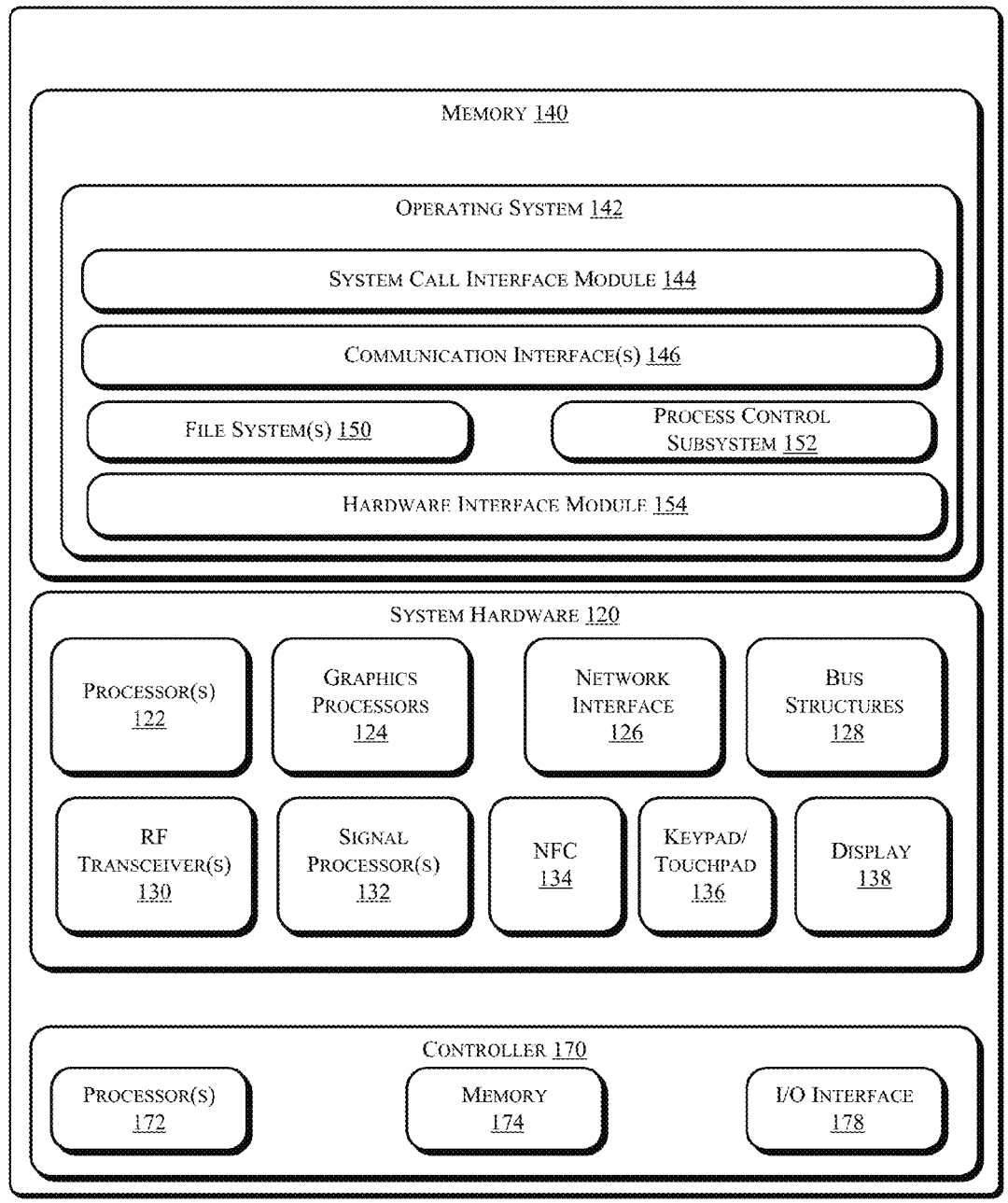
FIG. 4 is a schematic illustration of an electronic device which may be adapted to incorporate a connector in accordance with some examples.
Figure 4:
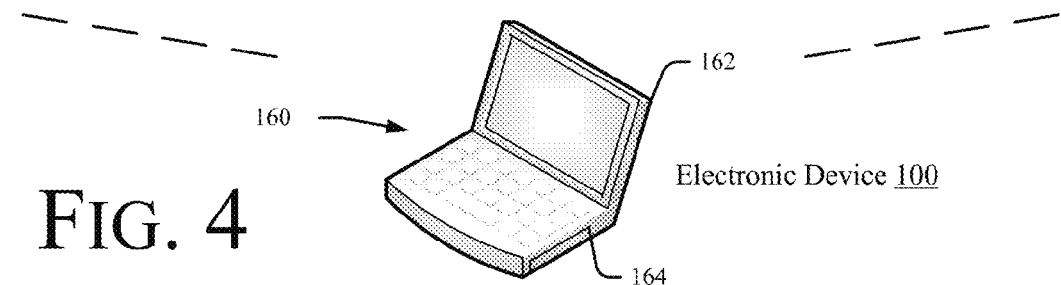

FIG. 4 is a schematic illustration of an electronic device 100 which may be adapted to implement a spring connector in accordance with some examples. In some examples electronic device 100 may be embodied as a table computing device which include a chassis 160 having a first section 162. The first section 162 may be selectively coupled to a second section 164, which may comprise a keyboard to allow the device to be configured in a manner similar to a laptop computer. In various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one example, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one example, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one example, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more input/output interfaces such as, e.g., a keypad 136 and a display 138. In some examples electronic device 100 may not have a keypad and use the touch panel for input.

Memory 140 may include an operating system 142 for managing operations of electronic device 100. In one example, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms In the example depicted in FIG. 4 the controller 170 comprises a processor 172, a memory module 174, and an I/O interface 178. In some examples the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122.

Figure 5A:
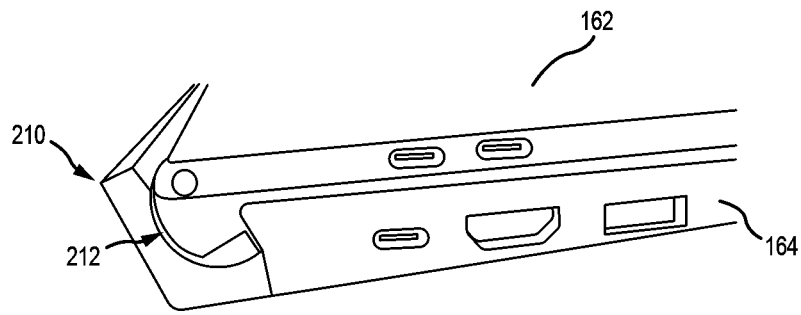
FIGS. 5A-5C are schematic side-view illustrations of an electronic device which may be adapted to incorporate a connector in accordance with some examples.
Figure 5B:
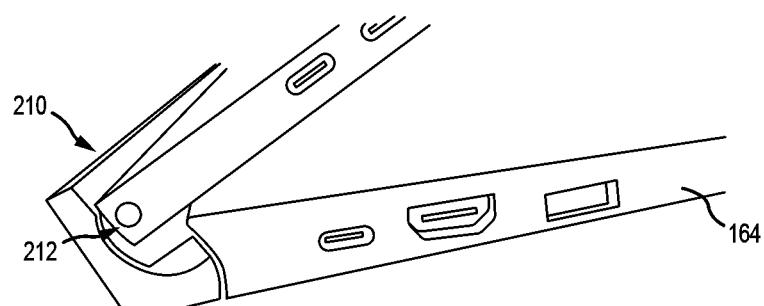
Figure 5C:
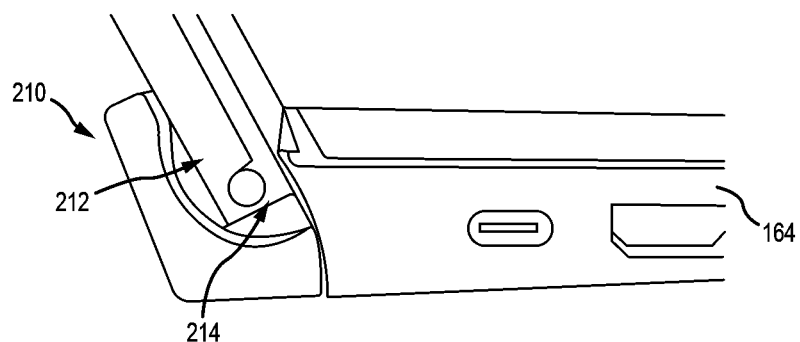

FIGS. 5A-5C are schematic side-view illustrations of an electronic device which may be adapted to incorporate a connector in accordance with some examples. Referring to FIGS. 5A-5C, in some examples the second section 164 of the chassis 160 for electronic device 100 may include a connection assembly 210 which comprises a curved surface 212 adapted to mate with a surface of the housing 162. The curved surface 212 enables the housing 160 of the electronic device 100 to emulate the motion of a laptop computing device. More particularly, the first section 162 of the electronic device 100 may be positioned flat on top of the section section 164 of the housing 160 (FIG. 5A). In order to couple the first section 162 to the second section 164 the first section maybe rotated along the curved surface as depicted in FIG. 5B to a resting position as depicted in FIG. 5C.

Figure 1A:
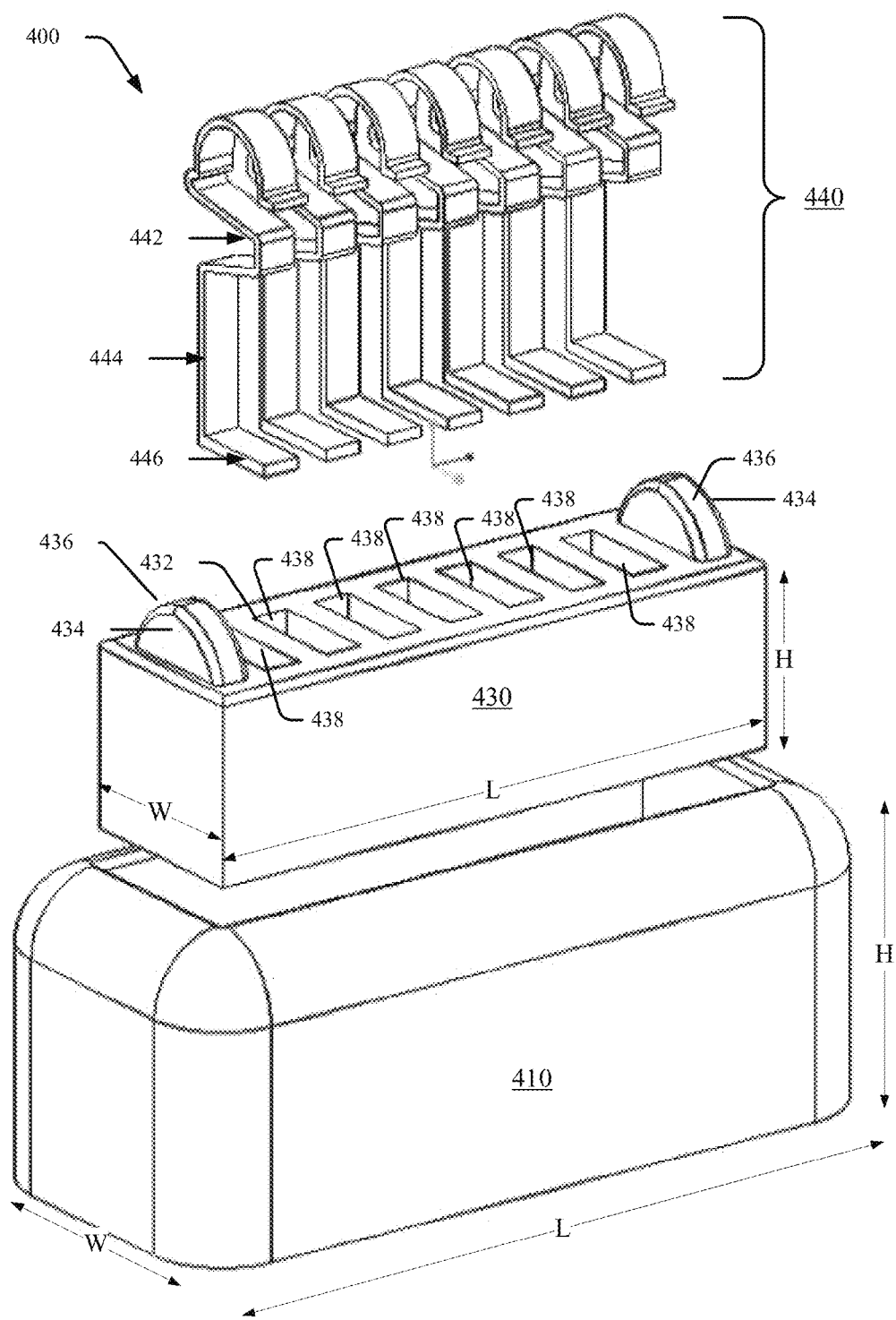
FIGS. 1A-1E are schematic illustrations of components of a connector in accordance with some examples.
Figure 2:
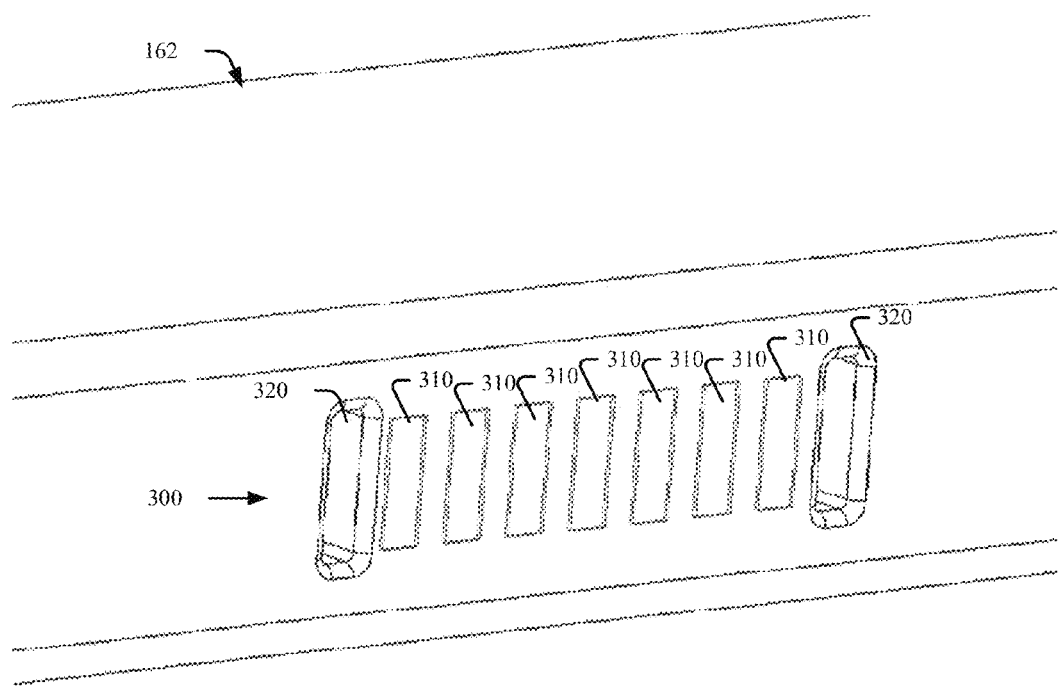
FIG. 2 is a schematic illustration of a receptacle in accordance with some examples.

FIGS. 1A-1E, 2, and 3A-3B are schematic illustrations of a connector assembly which may be used to provide a connection between the first section 162 and the second section 164 of the housing 160 for the electronic device, in accordance with some examples. Referring first to FIG. 2, in some examples the first section 162 of the housing 160 may comprise a receptacle 300 which in turn comprises a plurality of electrical contacts 310 and at least one guide structure 320. Electrical contacts 310 may be formed from a suitable conductive material, e.g., copper, steel, aluminum, or the like. Guide structures 320 may be formed as apertures in the first section 162 of housing 160.

Referring FIGS. 1A-1E and 3A-3B, in some examples a connector 400 to connect a first section 162 of the chassis to a second section 164, comprising a housing 410 defining a first shaft 420, a retention structure 430 disposed in the shaft 420, and a plurality of electrical contacts 440 positioned within a corresponding plurality of channels 438 in the retention structure 430.

In some examples the housing 410 may be formed of a suitably rigid material, e.g., a rigid polymer, a metal such as steel or aluminum, or a composite material. While the particular dimensions of the housing 410 are not critical, in some examples the housing 410 may have a length along an axis indicated by the reference L in FIG. 1A that measures between 5 millimeters and 50 millimeters, a width indicated by reference W in FIG. 1A that measures between 2 millimeters and 20 millimeters, and a height indicated by the reference H in FIG. 1B that measures between 5 millimeters and 50 millimeters.

In some examples the housing 410 defines an interior shaft 420 which is substantially rectangular in cross section when viewed through a plane that is nominally vertical (i.e., a plane that extends along the height H of the housing and either the length L or the width W of the housing 410) or a plane that is nominally horizontal (i.e., a plane that extends along either the length L or the width W of the housing 410 and the height H of the housing). While the particular dimensions of the shaft 420 are not critical, in some examples the shaft 420 may have a length along an axis indicated by the reference L in FIG. 4B that measures between 5 millimeters and 50 millimeters, a width indicated by reference W in FIG. 1A that measures between 2 millimeters and 20 millimeters, and a height indicated by the reference H in FIG. 1A that measures between 5 millimeters and 50 millimeters.

In some examples the retention structure 430 may be formed of a suitably rigid material, e.g., a rigid polymer, or a composite, non-conductive material. While the particular dimensions of the retention structure 430 are not critical, in some examples the retention structure 430 may have a length along an axis indicated by the reference L in FIG. 1A that measures between 5 millimeters and 50 millimeters, a width indicated by reference W in FIG. 1B that measures between 2 millimeters and 20 millimeters, and a height indicated by the reference H in FIG. 1A that measures between 5 millimeters and 50 millimeters.

In some examples the retention structure 430 comprises a plurality of channels 438 formed in a first surface 432 thereof. As described above, in some examples the plurality of electrical contacts 440 are dimensioned to be positioned within the plurality of channels 438 in the retention structure 430. Electrical contacts 440 may be formed of a suitably conductive material, e.g., a metal such as copper, steel, aluminum or the like. In the examples depicted herein the electrical contacts are all substantially identical in shape and size and include a spring mechanism 442 which flexes when a force is applied to the electrical contact. Electrical contacts 440 further comprise a leg section 444 which extends from the spring mechanism to a foot section 446. In some examples the electrical contacts 440 may be dimensioned such that the foot section 446 is buttressed against the housing 410 at the bottom of its respective channel 438 and may include a first lip 450 and a second lip 452 which contact the retention structure 430 such that the electrical contacts 440 provide a reactive force when the spring is compressed or when the retention structure is pushed into the shaft 420 (FIG. 1E).

In some examples the retention structure 430 comprises at least one protection structure 434 extending from a first surface 432 thereof. In the embodiment depicted herein the retention structure comprises two protection structures 434, but one skilled in the art will recognize that three or more protection structures 434 may be positioned on the surface 432 of retention structure 430. In embodiments described herein the protection structure 434 extends above the plurality of electrical contacts 440 and comprises a curved surface 436 adapted to mate with a guide structure on a receptacle disposed on the second section 164.

Figure 1B:
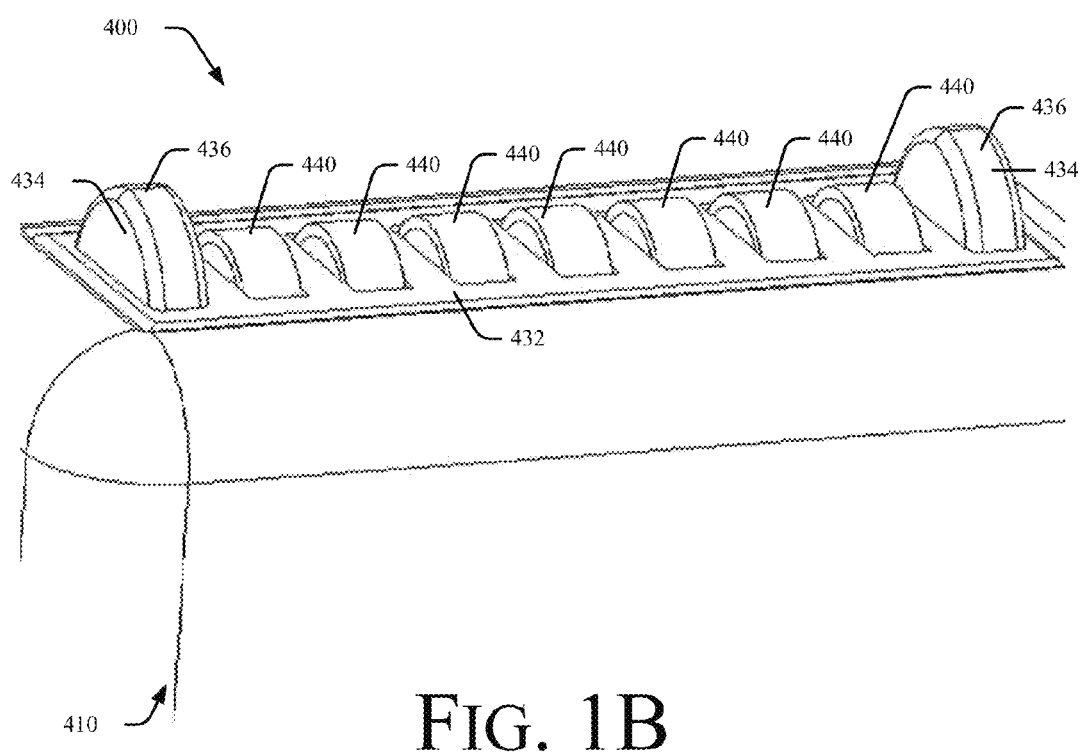
Figure 1C:
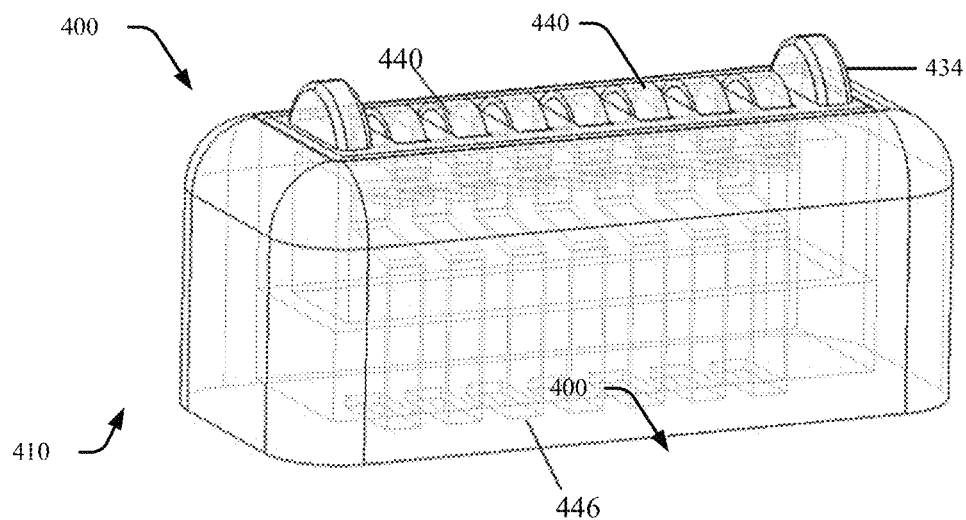
Figure 1D:
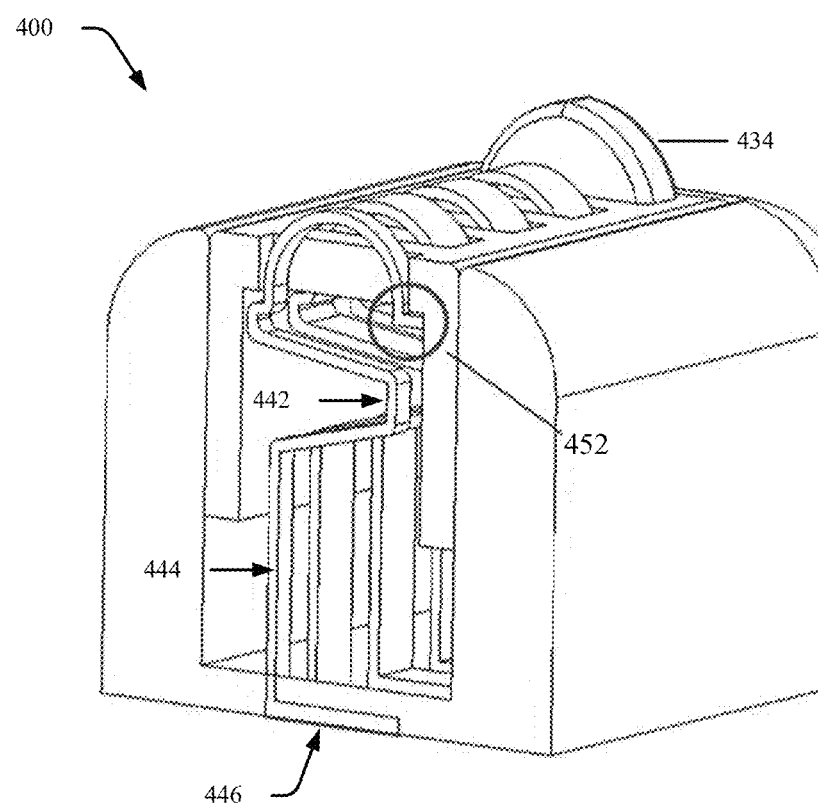
Figure 1E:
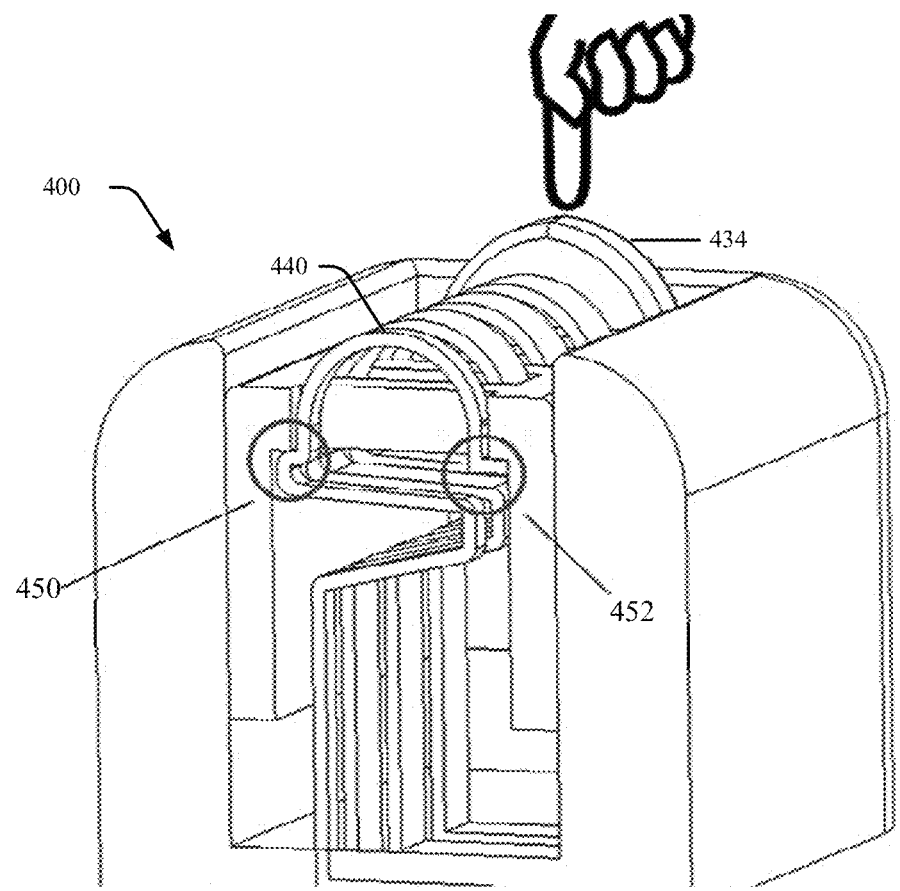

As illustrated in FIGS. 1D and 1E, in some examples the retention structure 430 is moveable in the shaft 420 between a first position (FIG. 1D) in which the protection structure 434 extends from the housing 410 and a second position in which the protection structure 434 is disposed at least partially within the housing 410 (FIG. 1E). Further, in some examples the plurality of electrical contacts 440 independently moveable within their respective channels 438, e.g., by applying pressure to the electrical contacts 440.

Figure 3A:
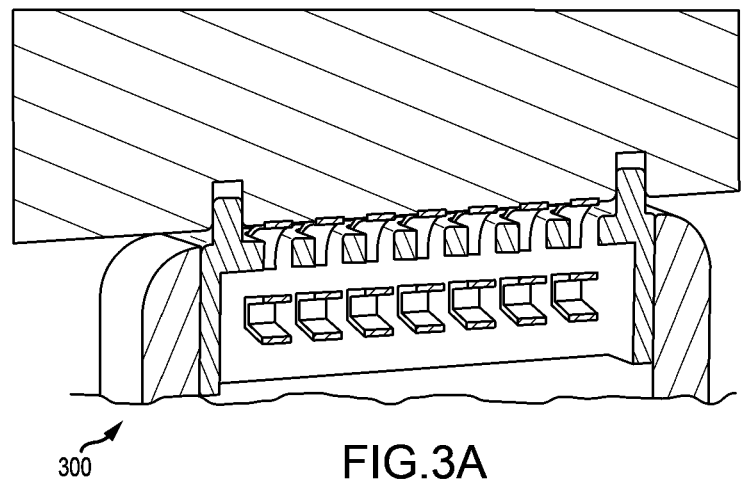
FIGS. 3A-3B are schematic illustration of an assembled connector in accordance with some examples.
Figure 3B:
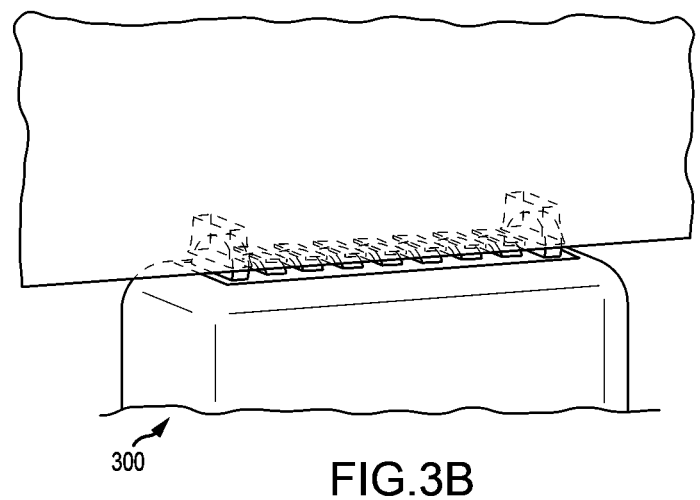

In some examples the connector 400 may be positioned on the lower surface 214 of the connection assembly 210 in a position opposite the receptacle 300 such that the protection structures 434 of the connector align with the guide structures 320 on the receptacle. When the first section 162 of the chassis is rotated about the curved surface 212 as illustrated in FIGS. 5A-5C the protection structures inhibit contact between the electrical contacts 310 on the receptacle 300 and the electrical contacts 440 on the connector 400 until the first section 162 is positioned at the angle depicted in FIG. 5C, whereupon the protection structure slides into the guide structures 320 on the receptacle 300, thereby allowing the electrical contacts 310 on the receptacle 300 to make electrical contact with the electrical contacts 440 on the connector 400, as depicted in FIGS. 3A-3B.

Figure 6:
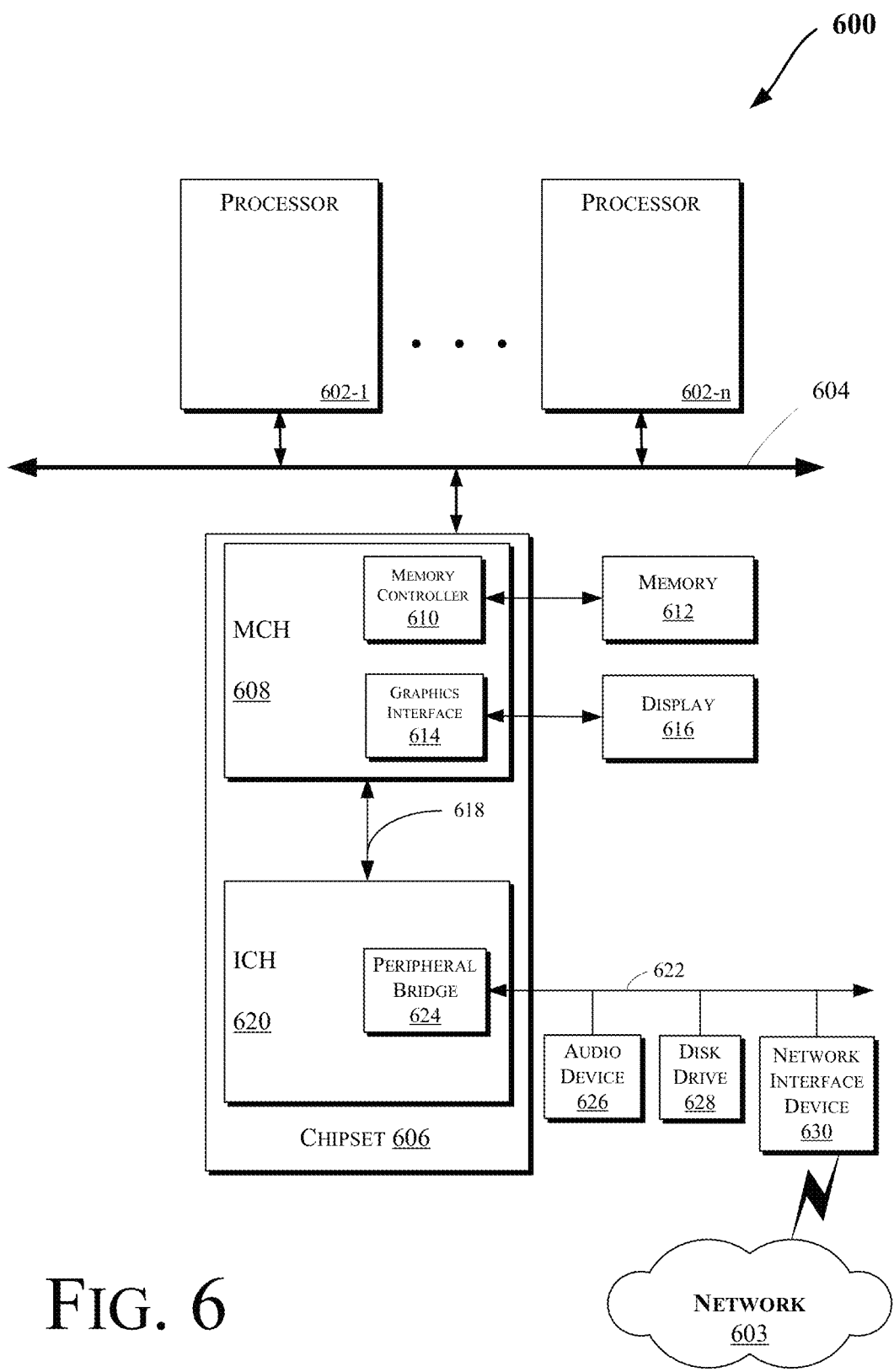
FIGS. 6-10 are schematic illustrations of electronic devices which may be adapted to incorporate a connector in accordance with some examples.

As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors of FIG. 1.

A chipset 606 may also communicate with the interconnection network 604. The chipset 606 may include a memory control hub (MCH) 608. The MCH 608 may include a memory controller 610 that communicates with a memory 612. The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
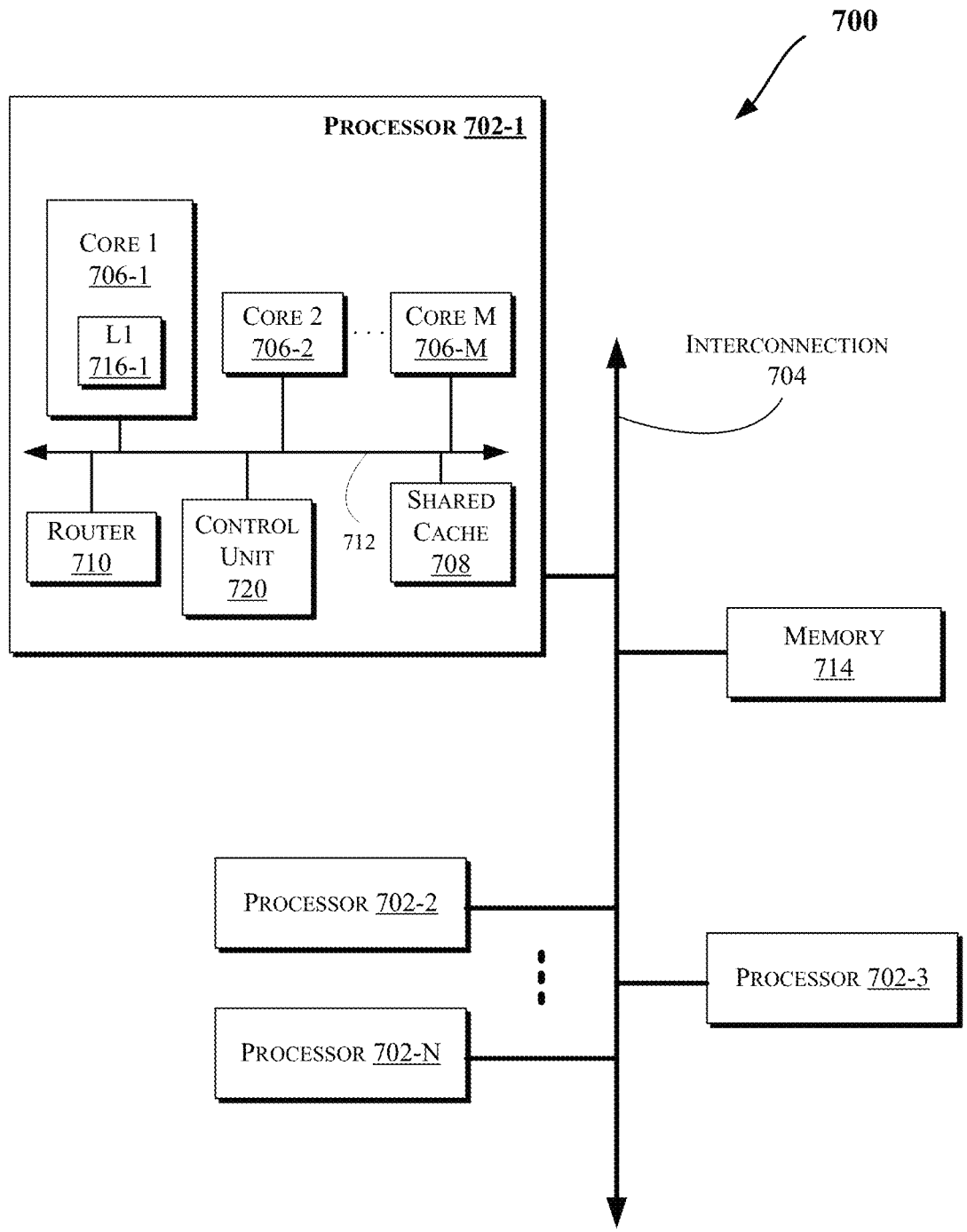

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716").

Figure 8:
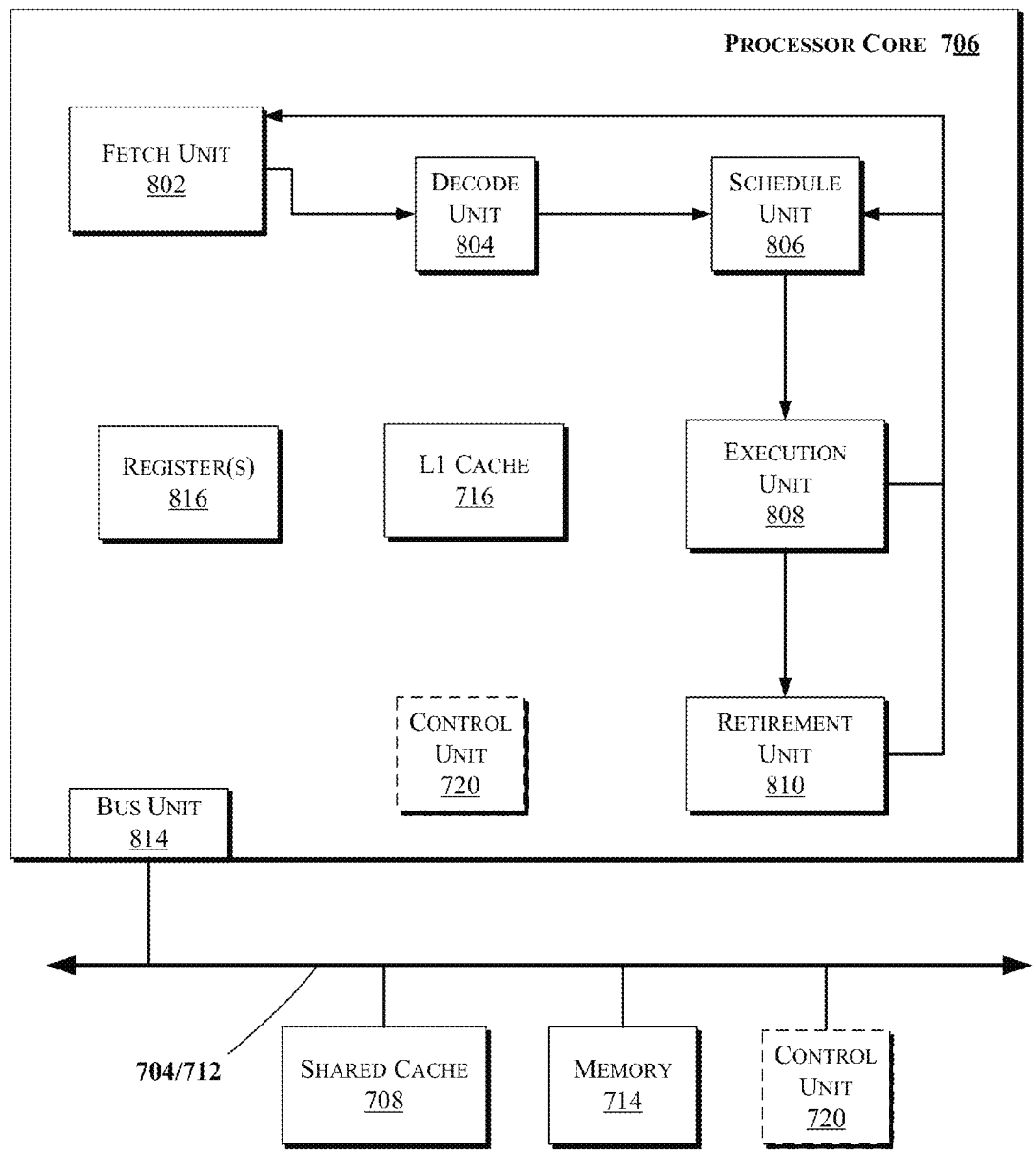

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
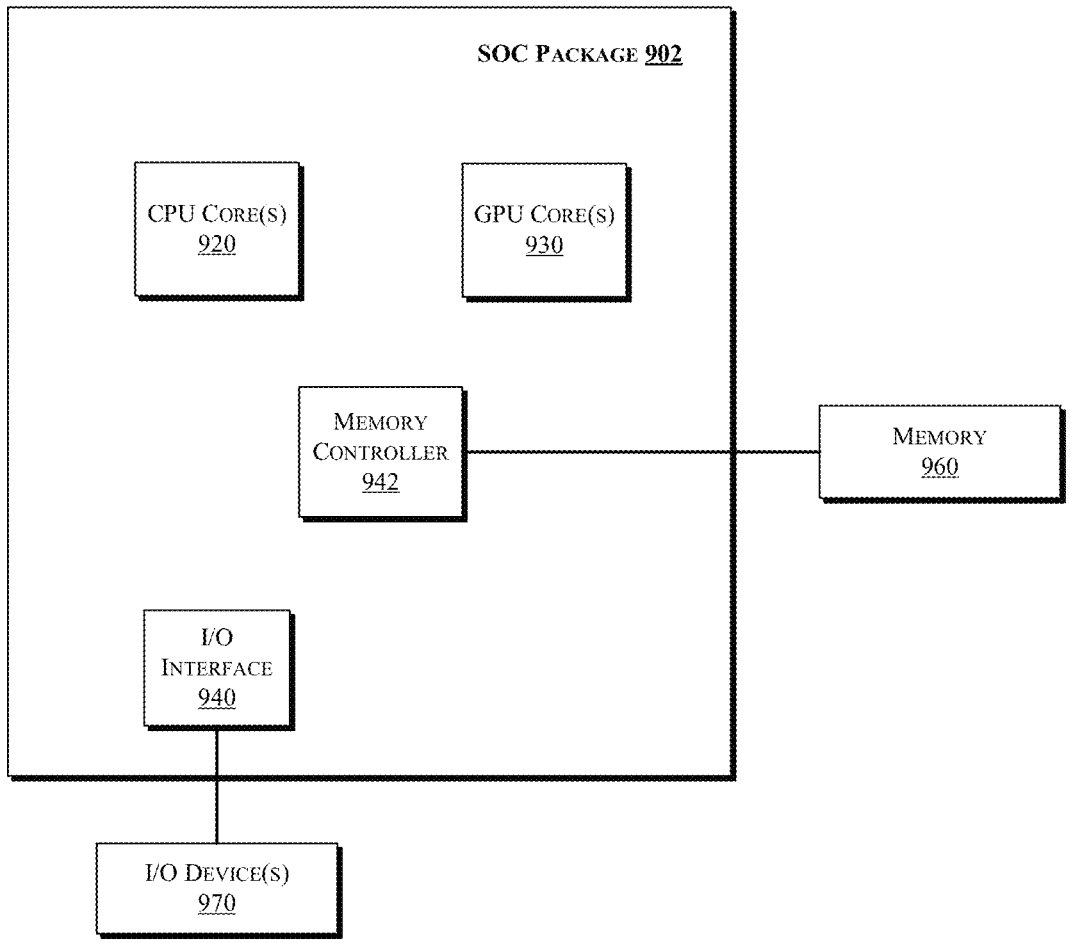

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device (s) 970 may include one or more of a keyboard, a mouse, a touchpad, a display, an image/video capture device (such as a camera or camcorder/video recorder), a touch surface, a speaker, or the like.

Figure 10:
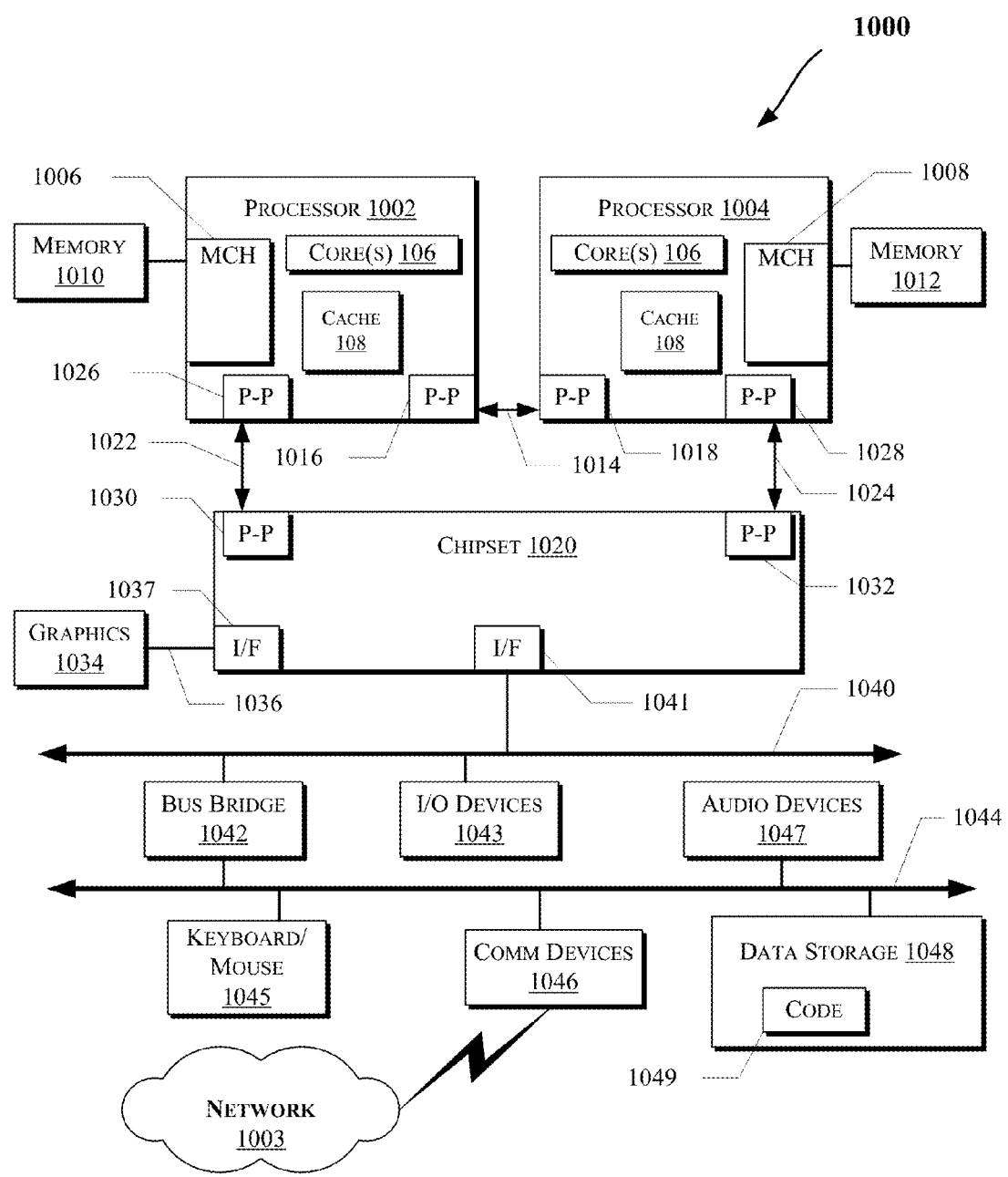

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following pertain to further examples.

Example 1 is chassis for an electronic device, comprising a first section and a connector to connect the first section of the chassis to a second section, the connector comprising a housing defining a first shaft, a retention structure disposed in the shaft, and a plurality of electrical contacts positioned within a corresponding plurality of channels in the retention structure.

In Example 2, the subject matter of Example 1 can optionally include an arrangement in which the shaft is substantially rectangular in cross section.

In Example 3, the subject matter of any one of Examples 1-2 can optionally include an arrangement in which the retention structure comprises at least one protection structure extending from a first surface thereof.

In Example 4, the subject matter of any one of Examples 1-3 can optionally include an arrangement in which the protection structure extends above the plurality of electrical contacts.

In Example 5, the subject matter of any one of Examples 1-4 can optionally an arrangement in which the retention structure comprises a curved surface adapted to mate with a guide structure on a receptacle disposed on the second section.

In Example 6, the subject matter of any one of Examples 1-5 can optionally include an arrangement in which the retention structure is moveable in the shaft between a first position in which the protection structure extends from the housing and a second position in which the protection structure is disposed at least partially within the housing.

In Example 7, the subject matter of any one of Examples 1-6 can optionally include an arrangement in which the electrical contacts comprise a foot section which is buttressed against the housing at the bottom of a channel and a first lip and a second lip which contact the retention structure such that the electrical contacts provide a reactive force when the spring is compressed or when the retention structure is pushed into the shaft.

In Example 8, the subject matter of any one of Examples 1-7 can optionally include an arrangement in which the plurality of electrical contacts comprise a spring mechanism.

In Example 9, the subject matter of any one of Examples 1-8 can optionally include an arrangement in which the plurality of electrical contacts are independently moveable within their respective channels.

Example 10 is an electronic device, comprising at least one electronic component, a chassis comprising a first section, and a connector to connect the first section of the chassis to a second section, the connector comprising a housing defining a first shaft, a retention structure disposed in the shaft, and a plurality of electrical contacts positioned within a corresponding plurality of channels in the retention structure.

In Example 11, the subject matter of Example 10 can optionally include an arrangement in which the shaft is substantially rectangular in cross section.

In Example 12, the subject matter of any one of Examples 10-11 can optionally include an arrangement in which the retention structure comprises at least one protection structure extending from a first surface thereof.

In Example 13, the subject matter of any one of Examples 10-12 can optionally include an arrangement in which the protection structure extends above the plurality of electrical contacts.

In Example 14, the subject matter of any one of Examples 10-13 can optionally an arrangement in which the retention structure comprises a curved surface adapted to mate with a guide structure on a receptacle disposed on the second section.

In Example 15, the subject matter of any one of Examples 10-14 can optionally include an arrangement in which the retention structure is moveable in the shaft between a first position in which the protection structure extends from the housing and a second position in which the protection structure is disposed at least partially within the housing.

In Example 16, the subject matter of any one of Examples 10-15 can optionally include an arrangement in which the electrical contacts comprise a foot section which is buttressed against the housing at the bottom of a channel and a first lip and a second lip which contact the retention structure such that the electrical contacts provide a reactive force when the spring is compressed or when the retention structure is pushed into the shaft.

In Example 17, the subject matter of any one of Examples 10-16 can optionally include an arrangement in which the plurality of electrical contacts comprise a spring mechanism.

In Example 18, the subject matter of any one of Examples 10-17 can optionally include an arrangement in which the plurality of electrical contacts are independently moveable within their respective channels.

Example 19 is a connector to connect a first section of the chassis to a second section, the connector comprising a housing defining a first shaft, a retention structure disposed in the shaft, and a plurality of electrical contacts positioned within a corresponding plurality of channels in the retention structure.

In Example 20, the subject matter of Example 19 can optionally include an arrangement in which the shaft is substantially rectangular in cross section.

In Example 21 the subject matter of any one of Examples 19-20 can optionally include an arrangement in which the retention structure comprises at least one protection structure extending from a first surface thereof.

In Example 22, the subject matter of any one of Examples 19-21 can optionally include an arrangement in which the protection structure extends above the plurality of electrical contacts.

In Example 23, the subject matter of any one of Examples 19-22 can optionally an arrangement in which the retention structure comprises a curved surface adapted to mate with a guide structure on a receptacle disposed on the second section.

In Example 24, the subject matter of any one of Examples 19-23 can optionally include an arrangement in which the retention structure is moveable in the shaft between a first position in which the protection structure extends from the housing and a second position in which the protection structure is disposed at least partially within the housing.

In Example 25, the subject matter of any one of Examples 19-24 can optionally include an arrangement in which the electrical contacts comprise a foot section which is buttressed against the housing at the bottom of a channel and a first lip and a second lip which contact the retention structure such that the electrical contacts provide a reactive force when the spring is compressed or when the retention structure is pushed into the shaft.

In Example 26, the subject matter of any one of Examples 19-25 can optionally include an arrangement in which the plurality of electrical contacts comprise a spring mechanism.

In Example 27, the subject matter of any one of Examples 19-26 can optionally include an arrangement in which the plurality of electrical contacts are independently moveable within their respective channels.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A chassis for an electronic device, comprising:
 a first section;
 a connection assembly having a curved surface adapted to mate with a surface of the first section and a lower surface adjacent the curved surface; and
 a connector positioned on the lower surface of the connection assembly to connect the first section of the chassis to a second section, the connector comprising:
 a housing defining a first opening;

a retention structure disposed in the opening and comprising at least one protection structure extending from a first surface of the retention structure; and a plurality of electrical contacts positioned within a corresponding plurality of channels in the retention structure, wherein the retention structure comprises a curved surface adapted to mate with a guide structure on a receptacle disposed on the second section, such that when the first section is rotated about the curved surface the at least one protection structure inhibits contact between the plurality of electrical contacts in the retention structure and one or more electrical contacts on the first section until the at least one protection structure slides into a guide structure on the first surface, thereby allowing the plurality of electrical contacts in the retention structure to make electrical contact with the one or more electrical contacts on the first section.

2. The chassis of claim 1, wherein:
the opening is substantially rectangular in cross section.

3. The chassis of claim 1, wherein the protection structure extends above the plurality of electrical contacts.

4. The chassis of claim 1, wherein the retention structure is moveable in the opening between a first position in which the protection structure extends from the housing and a second position in which the protection structure is disposed at least partially within the housing.

5. The chassis of claim 4, wherein the electrical contacts comprise:
a foot section which is buttressed against the housing at the bottom of a channel; and
a first lip and a second lip which contact the retention structure such that the electrical contacts provide a reactive force when the spring is compressed or when the retention structure is pushed into the opening.

6. The chassis of claim 1, wherein the plurality of electrical contacts comprise a spring mechanism.

7. The chassis of claim 5, wherein the plurality of electrical contacts are independently moveable within their respective channels.

8. An electronic device, comprising:
at least one electronic component;
a chassis comprising a first section; and
a connection assembly having a curved surface adapted to mate with a surface of the first section and a lower surface adjacent the curved surface; and
a connector positioned on the lower surface of the connection assembly to connect the first section of the chassis to a second section, the connector comprising:
a housing defining a first opening;
a retention structure disposed in the opening and comprising at least one protection structure extending from a first surface of the retention structure; and
a plurality of electrical contacts positioned within a corresponding plurality of channels in the retention structure,
wherein the retention structure comprises a curved surface adapted to mate with a guide structure on a receptacle disposed on the second section, such that when the first section is rotated about the curved surface the at least one protection structure inhibits contact between the plurality of electrical contacts in the retention structure and one or more electrical contacts on the first section until the at least one protection structure slides into a guide structure on the first surface, thereby allowing the plurality of electrical contacts in the retention structure to make electrical contact with the one or more electrical contacts on the first section.

9. The electronic device of claim 8, wherein:
the opening is substantially rectangular in cross section.

10. The electronic device of claim 8, wherein the protection structure extends above the plurality of electrical contacts.

11. The electronic device of claim 8, wherein the retention structure is moveable in the opening between a first position in which the protection structure extends from the housing and a second position in which the protection structure is disposed at least partially within the housing.

12. The electronic device of claim 11, wherein the electrical contacts comprise:
a foot section which is buttressed against the housing at the bottom of a channel; and
a first lip and a second lip which contact the retention structure such that the electrical contacts provide a reactive force when the spring is compressed or when the retention structure is pushed into the opening.

13. The electronic device of claim 8, wherein the plurality of electrical contacts comprise a spring mechanism.

14. The electronic device of claim 13, wherein the plurality of electrical contacts are independently moveable within their respective channels.

* * * * *